United States Patent [19]

Smith

[11] Patent Number: 4,833,782
[45] Date of Patent: May 30, 1989

[54] SABER SAW TRACING LIGHT

[75] Inventor: Lonnie W. Smith, Orange, Calif.

[73] Assignee: Robert E. Strauss, Santa Ana, Calif.; a part interest

[21] Appl. No.: 56,379

[22] Filed: Jun. 1, 1987

[51] Int. Cl.⁴ .............................................. B27B 19/04
[52] U.S. Cl. ........................................ 30/392; 30/123; 30/371; 83/520; 362/119
[58] Field of Search ................. 30/123, 371, 392, 393; 362/32, 119; 83/520

[56] References Cited

U.S. PATENT DOCUMENTS

| | | | |
|---|---|---|---|
| 2,193,878 | 3/1940 | Martin | 362/119 X |
| 2,488,947 | 11/1949 | Vavrik | 83/520 X |
| 2,806,492 | 9/1957 | Becker | 83/520 |
| 3,457,796 | 7/1969 | Leach et al. | 30/393 X |
| 3,504,716 | 4/1970 | Bush et al. | 30/371 |

Primary Examiner—Donald R. Schran
Assistant Examiner—Michael D. Folkerts
Attorney, Agent, or Firm—Plante, Strauss & Vanderburgh

[57] ABSTRACT

This invention comprises a focused light attachment for use with a portable power-driven hand saw, particularly a saber saw. The invention comprises a light source such as an electric lamp with a suitable electrical power source and a focusing mechanism for projecting a very narrow beam of light. The light source and focusing mechanism is mounted on the front of the hand saw and is positioned to project its narrow light beam a substantial distance in front of the saw blade so that it can be used to trace or follow a previously scribed saw line. The tracing light can be used in combination with a flood light that is mounted also on the front of the saw housing and positioned to flood the area surrounding the saw blade with illumination. Most preferably, the tracing light and its focusing mechanism are mounted permanently within the housing of a saber saw.

8 Claims, 2 Drawing Sheets

SABER SAW TRACING LIGHT

BACKGROUND OF THE INVENTION

1. Field of the Invention

This invention relates to a tracing light for saws and the like and, in particular to a tracing light for portable hand saws, particularly saber saws.

2. Brief Statement of the Prior Art

Floodlights have been used with power driven tools to illuminate the entire work surface in the vicinity of the tool such as disclosed in U.S. Pat. Nos. 2,193,878 and 2,852,051 for a router, 2,525,588 for a hand drill, 2,588,288 for hand saws, and 4,230,453 for a dentist drill. Lights have also been used on saber saws such as shown in U.S. Pat. No. 3,393,309. U.S. Pat. No. 3,504,716 discloses an optical focusing guide for use on saber saws.

While a focused beam of light has been used as a guide for a drill bit in U.S. Pat. No. 3,728,077, heretofore, there have been no prior attempts to use a narrow beam of focused light as a tracing guide for use on a saw and particularly for a portable hand saw. Instead, the prior art has concentrated on mechanical guides, fences, etc., for controlling the cutting paths of these saws.

BRIEF DESCRIPTION OF THE INVENTION

This invention comprises a focused light attachment for use with a portable power-driven hand saw, particularly a saber saw. The invention comprises a light source such as an electric lamp with a suitable electrical power source and a focusing mechanism for projecting a very narrow beam of light. The light source and focusing mechanism is mounted on the front of the hand saw and is positioned to project its narrow light beam a substantial distance in front of the saw blade so that it can be used to trace or follow a previously scribed saw line. The tracing light can be used in combination with a flood light that is mounted also on the front of the saw housing and positioned to flood the area surrounding the saw blade with illumination. Most preferably, the tracing light and its focusing mechanism are mounted permanently within the housing of a saber saw.

BRIEF DESCRIPTION OF THE DRAWINGS

The invention will be described with reference to the illustrations of which.

DESCRIPTION OF PREFERRED EMBODIMENT

Figure 1:
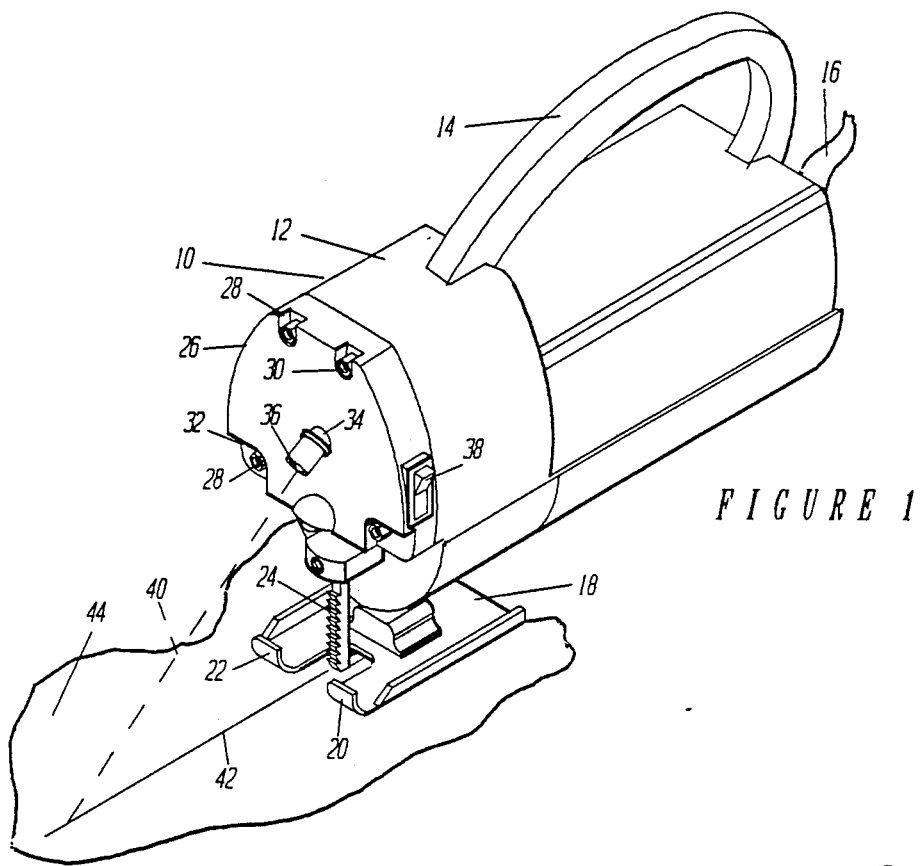
FIG. 1 is a perspective view of a suitable saber saw which incorporates the tracing light of the invention.

The tracing light invention is illustrated in FIG. 1 as applied to a portable hand saw, preferably a saber saw 10. The saw 10 has a conventional motor and gear housing 12 which includes a handle 14 and an electrical power cord 16. The saber saw 10 is conventional in construction and supports a bottom shoe 18 which has a pair of saw finger guides 20 and 22 that project on opposite sides of the reciprocating saw blade 24. The front of the housing 12 has a plate cover 26 which is secured thereto by assembly screws 28 that are mounted in recessed pockets 30 or corners 32 of the plate cover 26.

The tracing light invention is incorporated in the saber saw 10 by providing a light source 34 with a narrow beam focusing means such as the lens 36 that is mounted in the front plate cover 26 of the housing 12. The light source (not shown) is contained within the housing 12, in proximity to the focusing mechanism and, if desired, a switch 38 can be mounted in the cover 26 to turn the tracing light on and off.

The tracing light focusing mechanism is positioned on the front of motor housing 12 to project a very narrow beam of light 40 forward of the saw blade 24 by a substantial distance, typically from about 1 to about 5 inches. The narrow beam of light 40 is used to optically trace or follow the marked line 42 which is scribed on the work piece 44 for defining a straight cut for the saw 10.

Figure 2:
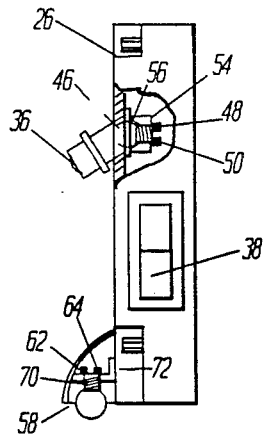
FIG. 2 is an elevational sectional view of the front cover of the saw shown in FIG. 1, illustrating the mounting of the tracing light and floodlight.
Figure 3:
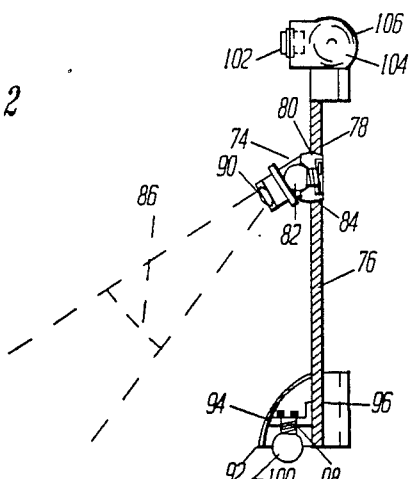
FIG. 3 is an elevational view of a suitable retrofit assembly of the tracing light and flood light for use on a saber saw such as that of FIG. 1.
Figure 6:
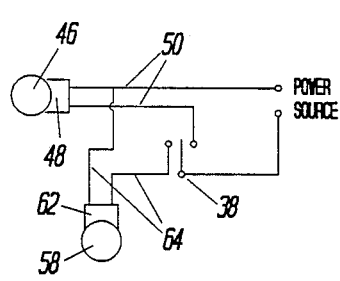
FIG. 6 is a schematic of our electrical circuit used with the invention.

Referring now to FIG. 2, the cover 26 is shown in elevational partial cross sectional view. As there illustrated, the light source is any conventional electric bulb 46 which is mounted in a bulb socket 48 having electrical connectors 50 which are in series through toggle switch 38 to the electrical power source, see FIG. 6. The bulb socket 48 is supported in a casing 54 which also supports the focusing lens 36. As illustrated in FIG. 3, this can be a casing which has an annular rim or shoulder 56 that seats against the inside surface of the plate cover 26 with the casing 54 received in an aperture in cover 26 in a friction fit to thereby secure the casing to the front plate cover.

In the preferred embodiment, the invention also includes a flood lamp 58 which is shown in FIG. 2 as mounted on the bottom of the front wall of the front plate cover 26, thereby being in a position to flood the work area immediately surrounding the blade 26 with illumination. As shown in FIG. 2, the flood lamp 58 is a conventional lighted bulb which seats in a bulb socket 62 having electrical connectors 64 which are connected with conductors in circuit through toggle switch 38 to the electrical power source for the saw 10, see FIG. 6. The flood light casing 72 can simply be a cylindrical bulb receptacle 70 which seats in a suitable aperture located in the casing 72 which is mounted on the front cover 26 of the saber saw motor housing 12 with conventional machine screws (not shown).

Figure 4:
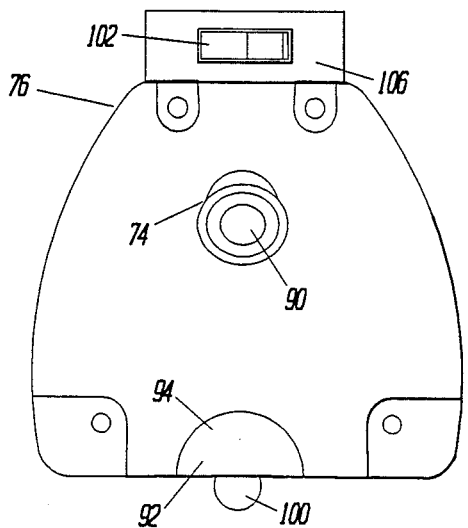
FIG. 4 is a front view of the saber saw with the accessory plate mounted thereon.

Referring now to FIGS. 3 and 4, the invention can also be provided as a retrofit assembly to be added to an existing saw 10. As illustrated in FIG. 3, the tracing light subassembly 74 can be supported on a mounting plate 76. Preferably the mounting plate 76 has a through aperture 78 with arcuate side walls 80 to receive the tracing light casing 82. The tracing light casing 82 can be of molded plastic with a base ring 84 having a mating arcuate exterior wall thereby providing for rotational adjustability of the tracing light casing 82 in its mounting. This rotational adjustability is illustrated by the arrow head line 86 to provide a range of distances at which the focused beam of light contacts the work piece as illustrated by the phantom line beams of light for the maximum and minimum projections in front of the saw blade 88. The molded casing 82 can support a lens 90 such as illustrated and described with reference to FIGS. 1 and 2 or, alternatively, can simply include a very small aperture, e.g., pinhole which will thereby permit the transmission of a very fine beam of light from the light source.

If desired, the aforementioned, retrofit assembly can be provided with a flood light 92 mounted in a flood light receptacle 94 located at the lower portion 96 of the plate 76. The flood light receptacle 94 includes a lighted bulb receptacle 98 which receives light bulb 100 and which is in electrical continuity through switch 102 to the power source. In the illustrated embodiment, the power source can be a storage battery or rechargeable dry cell such as batteries which are mounted in a battery compartment 106 also carried by the casing 76. In the illustrated embodiment, the battery compartment 106 is located at the upper extremity of the plate 76 where it will be received above the top of the motor casing for the saber saw 10.

Figure 5:
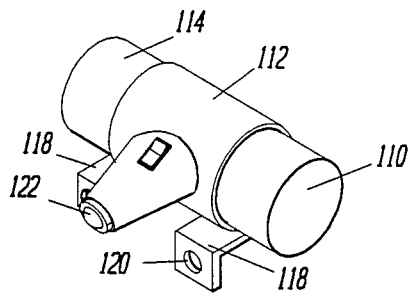
FIG. 5 is a perspective view of an alternative embodiment for retrofitting existing tools.

Referring now to FIG. 5, there is illustrated another embodiment which can be added to or attached to an existing saber saw 10. In this embodiment, the light source, focusing lens 122 and battery compartment 110 are all contained within a single housing 112 having a transverse housing 114 that has a pair of tabs 118 having apertures 120 to receive screws for mounting of the housing 112 to the front or upper extremities of the saber saw 10. The battery compartment has an additional transverse compartment 122 in which the light bulb and switch 124 and focusing lens 122 are mounted. This unit is mounted onto a saber saw 10 such as shown in FIG. 1.

The invention provides for very accurate and precise tracing of straight line cuts with a portable saber saw. The device completely eliminates the need for cumbersome tracing guides and fences that are commonly used with such saws. It will provide very precise control of a saber saw. The distance that the beam of light focuses in front of the saw blade is preferably adjustable so that the beam of light can be focused at a preselected distance depending on the speed of advance of the saw along the workpiece. Preferably, the tracing light is used in connection with a flood light that can be used when cutting scrolls and curved lines. In such applications, the switch is moved to extinguish the tracing light and illuminate the flood light which will thereby illuminate the area immediately surrounding the saw blade and thus permit accurate following of curved lines. With straight line cutting, however, the flood lamp is extinguished and the tracing light is illuminated to project the very narrow and precise beam of light on the marked cutting line.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a portable, power-driven, hand-held sabre saw having a tool casing including a motor housing with a motor mounted therein, a handle, a gear train and a straight, flat and narrow saw blade mounted for reciprocating movement thereon, the improvement comprising:
   a. A cutting line tracing light comprising:
      (1) an electrical power source;
      (2) a switch; and
      (3) a lamp electrically connected thereto;
   b. focusing means to project a narrow beam of light from said lamp;
   c. attachment means to mount said tracing light and focusing means on the front of said casing, positioned to project said narrow beam of light onto the work piece as a focused point of light at a predetermined straight line distance in front of said saw blade; and
   d. a flood lamp to illuminate the area surrounding said blade.

2. The portable power-driven hand saw of claim 1 including attachment means for the removable attachment of said lamp and focusing means onto the front of said saw casing.

3. The portable power-driven hand saw of claim 2 wherein said switch means is electrically coupled to both said tracing lamp and said flood lamp to illuminate either of said lamps.

4. The portable power-driven hand saw of claim 1 wherein said motor is an electrically driven motor and including electric power supply means to said casing.

5. The portable power-driven hand saw of claim 4 wherein said switch means is electrically connected between said tracing lamp and said electric power supply means.

6. The portable power-driven hand saw of claim 1 wherein said focusing means is an optical lens.

7. A portable, power-driven, hand-held sabre saw having a tool casing including a motor housing with a motor mounted therein, a handle, a gear train and a straight, flat and narrow saw blade mounted for reciprocating movement thereon, the improvement comprising:
   d. a cutting line tracing light comprising:
      (1) an electrical power source;
      (2) a switch; and
      (3) a lamp electrically connected thereto;
   e. focusing means to project a narrow beam of light from said lamp;
   f. attachment means to mount said tracing light and focusing means on the front of said casing, positioned to project said narrow beam of light onto the work piece as a focused point of light at a predetermined straight line distance in front of said saw blade and adjustable projection means to vary the amount of said straight line distance.

8. The portable power-driven hand saw of claim 7 wherein said adjustable projection means comprises a support bracket which receives said focusing means by a pivotal support.

* * * * *